United States Patent

[11] 3,612,718

| [72] | Inventors | Jack Palfreyman;<br>Henry Edward Middleton, both of Derby, England |
|---|---|---|
| [21] | Appl. No. | 885,173 |
| [22] | Filed | Dec. 15, 1969 |
| [45] | Patented | Oct. 12, 1971 |
| [73] | Assignee | Rolls-Royce Limited<br>Derby, England |
| [32] | Priority | Dec. 16, 1968 |
| [33] | | Great Britain |
| [31] | | 59739/68 |

[54] BLADED MEMBER FOR A FLUID FLOW MACHINE
8 Claims, 2 Drawing Figs.

| [52] | U.S. Cl. | 416/135, 416/190, 416/193, 416/500 |
|---|---|---|
| [51] | Int. Cl. | F01d 5/10 |
| [50] | Field of Search | 416/131, 134–136, 500, 138, 193, 190, 196, 219, 221 |

[56] References Cited
UNITED STATES PATENTS

| 2,198,784 | 4/1940 | Mikina | 416/196 |
| 2,772,854 | 12/1956 | Anxionnaz | 416/190 |
| 2,936,155 | 5/1960 | Howell et al. | 416/134 |
| 3,104,093 | 9/1963 | Craig et al. | 416/219 |
| 3,327,995 | 6/1967 | Blackhurst et al. | 416/224 X |

Primary Examiner—Everette A. Powell, Jr.
Attorney—Cushman, Darby & Cushman

ABSTRACT: A bladed member for a fluid flow machine comprises a plurality of angularly spaced-apart aerofoil-shaped blades whose root portions are pivotally mounted in a common blade support member, resilient means being provided for resiliently urging the blades towards predetermined relative angular positions.

PATENTED OCT 12 1971  3,612,718
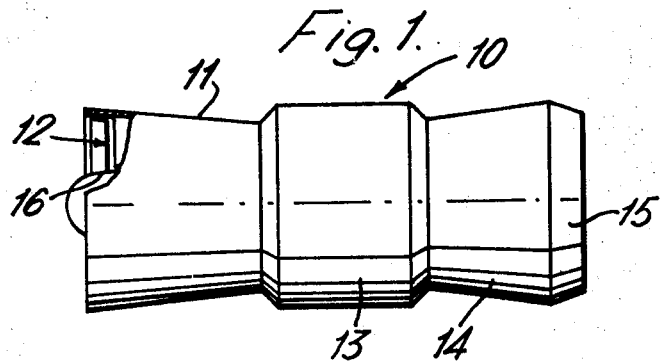
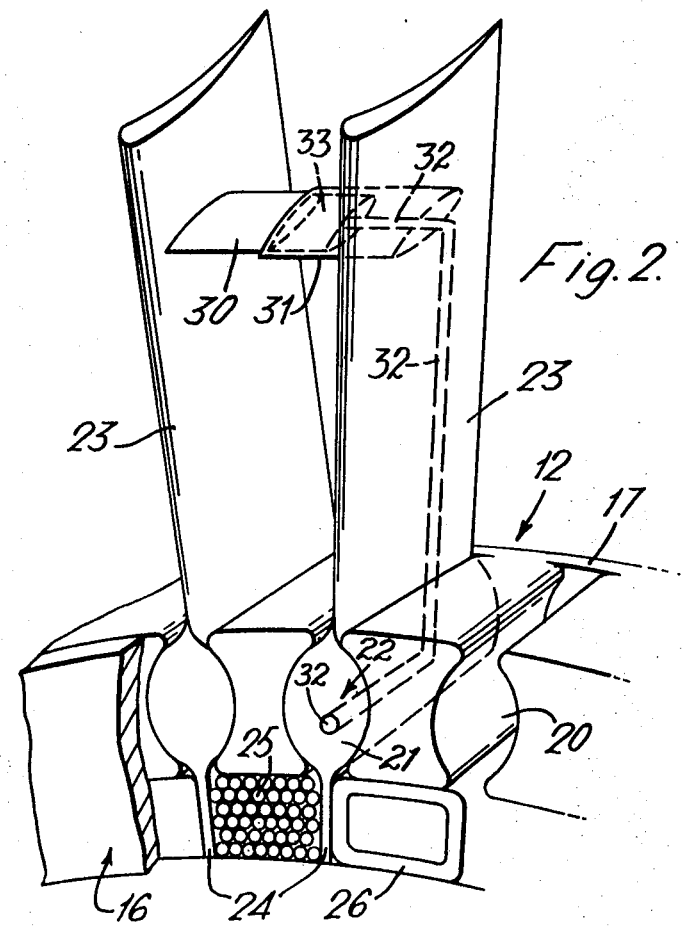
JACK PALFREYMAN
HENRY EDWARD MIDDLETON
By Cushman, Darby & Cushman
attorneys

BLADED MEMBER FOR A FLUID FLOW MACHINE

This invention concerns a bladed member, e.g. a bladed rotor member, for a fluid flow machine such, for example, as a gas turbine engine compressor.

According to the present invention, there is provided a bladed member for a fluid flow machine comprising a plurality of angularly spaced-apart airfoil-shaped blades whose root portions are pivotally mounted in a common blade support member, resilient means being provided for resiliently urging the blades towards predetermined relative angular positions.

As will be appreciated, if one of the blades is struck by a foreign object, such, for example, as a bird, the said resilient means will allow the respective blade to pivot with respect to the adjacent blades, whereby to diminish the damage done by the said foreign body.

The resilient means preferably act between the root portions of adjacent blades. Thus, the root portions of at least two adjacent blades may be separated by at least one assembly of elastomeric balls. Alternatively, the root portions of at least two adjacent blades may be separated by at least one inflatable member.

The root portion of each blade preferably has a substantially cylindrical part which is rotatably mounted in correspondingly shaped recess in the blade support member. Thus, each blade may have a root portion one part of which is dovetailed and fits into the said substantially cylindrical part.

Adjacent blades may respectively have telescopically arranged inner and outer clapper parts. Means, moreover, may be provided for supplying a pressure fluid to a space within the telescopically arranged inner and outer clapper parts so as to urge the latter apart.

The blade support member may constitute a part of a rotor member, although it is possible, if desired, for the bladed member to form part of a stator member.

The invention also comprises a gas turbine engine compressor provided with a bladed member as set forth above.

The invention is illustrated, merely by way of example, in the accompanying drawings, in which:

FIG. 1 is a diagrammatic view, partly in section, of a gas turbine engine provided with a bladed member according to the present invention, and FIG. 2 is a diagrammatic perspective view of part of the structure of the engine of FIG. 1.

In FIG. 1 there is shown a gas turbine jet engine 10 which is adapted for aircraft propulsion and which comprises an engine casing 11 within which there are mounted, in flow series, one or more compressors 12, combustion equipment 13 and one or more turbines 14, the turbine exhaust gases being directed to atmosphere through an exhaust duct 15.

The compressor 12 has, as best seen in FIG. 2, a rotor member 16, a part of which is constituted by an annular blade support member 17.

The blade support member 17 is provided with a plurality of angularly spaced-apart substantially cylindrical recesses 20. In each of the recesses 20 there is rotatably mounted a cylindrical part 21 of a root portion 22 of an airfoil-shaped blade 23. Thus, the plurality of angularly spaced-apart airfoil-shaped blades 23 which are carried by the blade support member 17 are pivotally mounted therein.

Each of the root portions 22 has a part 24 which extends radially inwardly of the cylindrical part 21. Between each adjacent pair of parts 24 there is arranged either an assembly of elastomeric balls 25 or an inflatable member 26. The assemblies 25, or the inflatable members 26, constitute resilient means which act between the parts 24 and serve to urge the blades 23 towards predetermined relative angular positions.

Adjacent blades 23 respectively have telescopically arranged inner and outer clapper parts 30, 31 which serve to prevent relative axial movement between the adjacent blades. If desired means such as a duct 32 may be provided for supplying a pressure fluid to a space within the clapper parts 30, 31 so as to urge the latter apart.

As will be appreciated, if a bird, or any other foreign body, should strike one of the blades 23 the construction is such as to allow the struck blade to pivot with respect to its adjacent blades whereby to limit the damage caused by the impact.

As shown in FIG. 2, the main part of each blade 23 is integral with the cylindrical part 21. However, if desired, each blade may have a root portion one part of which is dovetailed and fits into a correspondingly shaped recess in said cylindrical part.

Although the construction described above has been described with reference to its use on a rotor, it may also, if desired, be used on a stator.

We claim:

1. A bladed member for a fluid flow machine comprising:
   a plurality of angularly spaced-apart airfoil-shaped blades having root portions;
   a common blade support member;
   means pivotally mounting the root portion in said support member;
   resilient means normally urging said blades toward predetermined relative angular positions;
   said adjacent blades having respective telescoping inner and outer clapper parts, said telescoping inner and outer clapper parts defining within themselves a space;
   means to supply a fluid under pressure to said space to urge said telescoping inner and outer clapper parts of adjacent blades apart.

2. A bladed member as claimed in claim 1 in which said resilient means act directly on and between said root portions of adjacent blades.

3. A bladed member as claimed in claim 2 in which said resilient means between the root portions of at least two adjacent blades is at least one assembly of elastomeric balls, said assembly separating said root portions of the at least two adjacent blades.

4. A bladed member as claimed in claim 2 in which said resilient means between the root portions of at least two adjacent blades is at least one inflatable member separating said root portions of the at least two adjacent blades.

5. A bladed member as claimed in claim 1 in which the root portion of each blade has a substantially cylindrical part, the blade support member having a correspondingly shaped recess in which the substantially cylindrical part is mounted.

6. A bladed member as claimed in claim 1 comprising a rotor member of which the blade support member constitutes part.

7. A gas turbine engine compressor having a bladed member, said bladed member comprising a plurality of angularly spaced-apart airfoil-shaped blades having root portions; a common blade support member; means pivotally mounting the root portions of said blades in said support member; resilient means normally urging said blades toward predetermined relative angular positions; said adjacent blades having respective telescoping inner and outer clapper parts, said telescoping inner and outer clapper parts defining within themselves a space; and means to supply a fluid under pressure to said space to urge said telescoping inner and outer clapper parts of adjacent blades apart.

8. A fluid flow machine as claimed in claim 7 in which said bladed member is a rotor.